United States Patent
Boeck (10) Patent No.: US 11,216,286 B2
(45) Date of Patent: Jan. 4, 2022

(54) METHOD AND DEVICE FOR THE ACCELERATED EXECUTION OF APPLICATIONS

(71) Applicant: Sixten Boeck, Düsseldorf (DE)

(72) Inventor: Sixten Boeck, Düsseldorf (DE)

(73) Assignee: DACS Laboratories GmbH, Erkrath (DE)

( * ) Notice: Subject to any disclaimer, the term of this patent is extended or adjusted under 35 U.S.C. 154(b) by 0 days.

(21) Appl. No.: 15/964,321

(22) Filed: Apr. 27, 2018

(65) Prior Publication Data

US 2018/0246737 A1 Aug. 30, 2018

Related U.S. Application Data

(63) Continuation of application No. PCT/EP2016/076111, filed on Oct. 28, 2016.

(51) Int. Cl.
*G06F 9/445* (2018.01)
*G06F 9/448* (2018.01)
*G06F 8/61* (2018.01)
*G06F 16/17* (2019.01)

(52) U.S. Cl.
CPC ............ *G06F 9/44578* (2013.01); *G06F 8/63* (2013.01); *G06F 9/4482* (2018.02); *G06F 16/1724* (2019.01)

(58) Field of Classification Search
CPC ............ G06F 12/0862; G06F 11/3636; G06F 11/3612; G06F 2212/1016; G06F 9/44578; G06F 9/4482; G06F 8/63; G06F 16/1724
See application file for complete search history.

(56) References Cited

U.S. PATENT DOCUMENTS

| | | | | |
|---|---|---|---|---|
| 7,606,924 B2 * | 10/2009 | Raz | .......................... | G06F 9/445 709/231 |
| 10,002,000 B2 * | 6/2018 | Whaley | ................. | G06F 9/4401 |
| 2003/0140160 A1 * | 7/2003 | Raz | .......................... | G06F 9/445 709/231 |
| 2003/0142561 A1 * | 7/2003 | Mason, Jr. | ............ | G06F 9/4401 365/200 |

(Continued)

FOREIGN PATENT DOCUMENTS

| JP | 2005-339097 A | 12/2005 |
|---|---|---|
| JP | 2010-237837 A | 10/2010 |

OTHER PUBLICATIONS

David Chernicoff; "WindowsITPro—The Impact of Disk Fragmentation on Servers"; internet article http://learn.condusiv.com/rs/condusivtechnologies/images/impact_of_Fragmentation_on_Servers.pdf; Jan. 1, 2011.

(Continued)

*Primary Examiner* — S. Sough
*Assistant Examiner* — Cheneca Smith
(74) *Attorney, Agent, or Firm* — Reinhart Boerner Van Deuren P.C.

(57) ABSTRACT

An aim of the invention is to enable the acceleration of the execution, in particular the starting of an application. The invention relates to a method for executing an application which is performed by at least one device. The method involves providing data parts from a data memory, which are required for the execution of the application. The data parts are stored in the data memory in an order which is at least in some areas based on an expected required order.

21 Claims, 5 Drawing Sheets

(56) References Cited

U.S. PATENT DOCUMENTS

| | | |
|---|---|---|
| 2005/0204095 A1 | 9/2005 | Dayan et al. |
| 2007/0198780 A1* | 8/2007 | Boyd .................. G06F 12/0862 |
| | | 711/137 |
| 2010/0011323 A1 | 1/2010 | Peterson |
| 2011/0145496 A1* | 6/2011 | Whaley ................ G06F 9/4401 |
| | | 711/112 |
| 2014/0101389 A1* | 4/2014 | Nellans ............... G06F 12/0862 |
| | | 711/137 |
| 2015/0142880 A1 | 5/2015 | Arai et al. |

OTHER PUBLICATIONS

O&O Software GMBH; "O&O Defrag 14—User's guide", internet article http://www.oo-software.com/en/docs/userguide/ood14pro.pdf; Jan. 1, 2011.

\* cited by examiner

METHOD AND DEVICE FOR THE ACCELERATED EXECUTION OF APPLICATIONS

CROSS-REFERENCE TO RELATED PATENT APPLICATIONS

This patent application is a continuation of PCT/EP2016/076111, filed Oct. 28, 2016, which claims priority to German Application No. 10 2015 118 522.9, filed Oct. 29, 2015, the entire teachings and disclosure of which are incorporated herein by reference thereto.

FIELD OF THE INVENTION

The present invention relates, according to a first aspect, to a method for the execution of an application. According to a second aspect, the invention relates to a method for sending data parts. According to a third aspect, the invention relates to the storage of data parts. According to further aspects, the invention further relates to devices and computer programs.

BACKGROUND TO THE INVENTION

Generic methods of the abovementioned kind, in particular methods for the execution of an application, are known from the prior art.

During the startup process of an application, a number of seconds or minutes or, if the application has to be downloaded first from a server via a network such as the Internet, even a number of hours, may elapse before the application is finally ready for interactive use by a user. Generally, however, the user will want to use the selected application as soon as possible, meaning that the startup process should be as short as possible.

Furthermore, in recent times an increasingly frequent need has arisen to transfer executable applications, since these are no longer distributed on a data medium, but are distributed via a network, by way of example the Internet. A number of approaches have been taken to ensure that in this case also a short time until starting the application is achieved.

One example is what is known as video streaming, where the application is executed on a server and only an audio and video stream is transferred to a client, on which the application is intended to be used.

The disadvantage with this, however, is that the latency can in certain circumstances be too high to allow satisfactory and in particular fluid use of the application on the client remote from the server. By way of example, the bandwidth may not be sufficient, or latencies may occur of up to a few hundred milliseconds, in particular with transfers via the Internet. In addition, continuous transfer of data in the form of an audio and/or video stream is necessary, meaning that the client must be continuously online.

To address these disadvantages, what is known as application streaming is used, whereby an application is provided to a client on demand by a server. However, the application is not executed as with video streaming on the server with then only audio and/or video data being transferred to the client, rather the application itself is transferred and executed locally by the client. Because the application is executed locally on the client, the performance of the server does not have to be designed for executing the application. In addition, high latencies do not present a problem or are even irrelevant.

If, therefore, the application first has to be downloaded from a remote server via a network, such as the Internet, it may actually take many hours until the application can finally be interactively used by a user.

In order to address this particular disadvantage, it is known from the prior art, by way of example, to shorten the time required for downloading and installation of the application, so that ultimately the time until starting the application is shortened. To this end, for instance, blocks of a software title can be downloaded until an executable threshold is reached. The software title can then be executed and the downloading of further blocks of the software title can be continued, while the software title is being executed.

In this way the time before and until starting an application can be shortened, in particular if the application has to be downloaded from a remote server. However, following the (partial) downloading, the application is then stored as normal in a local memory of the user, by way of example their hard disc. In this regard, in the best-case scenario the actual startup process of the application would only be as fast as for a locally-installed application. This means that in this case also, even though the required data are already locally available, application startup still takes seconds or minutes until the user is able to interactively use the application.

However, as stated above, there is an interest not only in shortening the time until the application startup, but also for execution itself and in particular accelerating the actual startup itself. In the case of computer games, upon startup of the computer game users or gamers are, by way of example, often diverted through video sequences, until the computer game can finally be played. In this regard, a shortening of the application startup itself is also desirable. This applies equally to other applications. It also applies to both applications which are made available to the user though application streaming, and to applications which are already available to the user locally.

BRIEF DESCRIPTION OF A NUMBER OF EXEMPLARY EMBODIMENTS OF THE PRESENT INVENTION

An aim of the invention is therefore to indicate a generic method, devices and computer programs, with the intention of enabling the accelerated execution, in particular startup, of the application.

According to a first aspect, the invention relates to a method for executing an application which is performed by at least one device, said method comprising:

providing data parts from a data memory, which are required for the execution of the application, the data parts being stored in the data memory in an order which is at least in some areas based on an expected required order The invention takes advantage of the fact that when data parts are provided from a data memory, the data parts are stored in the data memory in a particular order, namely in an order which is at least in some areas based on an expected required order. This means that required data parts of the application can be regularly available more quickly than normal and in particular the application startup process—irrespective of whether the program is already locally installed or first has to be downloaded from a remote server—can be dramatically accelerated. Thus, in particular, a method for accelerated execution of an application is provided.

Here the data memory can, by way of example, be provided by a hard disc, a Solid State Disk (SSD), a working memory (RAM) or an external drive, to name just a few examples.

However, if an application is stored in a conventional manner in a data memory (for example on a hard disc), the order of the individual data parts in the data memory is, by way of example, dependent upon the file affiliation or the folder structure. Furthermore, the data parts are often present in a fragmented form, which slows down the execution of the application more. The fragmentation can above all be attributed to the actual file system used. Most file systems are developed so that an optimum overall performance can be achieved, leading to data parts belonging to an application becoming fragmented over time in the data memory. While modern file systems are able to minimize this effect during ongoing operation, the order of the data parts of individual files is nevertheless broken up as before. Irrespective of the various physical access mechanisms of available data memories, that is to say whether it is a case of, by way of example, a hard disc with rotating spindles, a Solid State Disk (SSD) or a working memory (RAM), the direct access (also referred to as random access or access by means of targeted jumps, known as seek operations) is just as slow.

Because now the data parts are stored in the data memory in an order which is at least in some areas based on an expected required order, the invention allows the data parts to be made available in a similar way to a continuous stream during a streaming process. If the data memory is, by way of example, a hard disc with a rotating spindle, generally all data parts located on the same track as a requested data part are read, since these pass the write-read head any way. So, no additional delay results from the reading of further data parts on the same track. Should these subsequently be requested, they are immediately available. In this regard, a preloading of the data parts is achieved ("data prefetching"). If the data memory is, by way of example, a data memory on a solid state basis(by way of example SSD, RAM), generally an entire memory page is read in one step instead of just the requested data part. Thus, a cache also contains the adjacently-stored data parts. If a short time later the next data part required is requested, this is already available in the cache. In this case, also, prefetching of the data parts is achieved. Finally, this method can also be advantageous in communication via a network, since for large distances (with many hops) the round-trip delay time can be a few hundred milliseconds and the requesting of individual data parts may take some time.

An application can in particular be a computer program, which is used to process, support or provide a useful or desired, non-system-oriented functionality. It is basically conceivable for the application to be used for image processing, video processing, text processing, spreadsheets and/certain operational functions such as financial accounting, customer administration, etc. The application is at least in part executed in the user space. Particularly preferably, the application is or comprises a computer game or part of this. The method can also comprise the step of executing the application.

To further increase performance, the method is preferably (at least in part) executed in the kernel space.

To execute the application, the application can, by way of example, comprise one or more executable files. Here, by way of example, a binary file in machine code or a bytecode file may be involved, which can be executed directly or by a runtime system, or a text file, which can be interpreted by an operating system shell. The data parts can, in particular, be data parts of the executable file.

The data parts required for executing the application can in particular be understood to be mandatory and/or optionally required data parts.

The fact that the order in which the data parts are stored in the data memory, is based on an expected required order, means in particular that the (physical) order in which the data parts are stored in the data memory, has been determined from the required (chronological) order. By way of example, the order, in which the data parts are stored in the data memory is the expected required order. The fact that this takes place at least in some areas means, in particular, that in the data memory data parts required for executing the application can to some extent also be stored conventionally, that is to say independently of the expected required order.

Here, an expected required order in particular means that it can be expected that the application will require data parts in the order. In other words, the data parts are in particular physically stored in an order, which reflects the chronological need for the data parts for the application. The expected required order can in particular be determined empirically. In particular, the expected required order can be determined as described in more detail in relation to the third aspect of the invention.

Not necessarily all the data parts required for execution of the application have to be stored as described. By way of example, just some of the data parts required for execution of the application can also be stored in order at least in some areas based on an expected required order.

The method according to the first aspect can in particular be executed by at least one first device, described in more detail in connection with other aspects.

According to an embodiment of the method of the first aspect, the method further comprises:

requesting the data parts required for executing the application.

The requesting can by way of example be performed by the application, by an operating system and/or a file system. By way of example, the application requires a data part for the execution and passes this on to the file system. The requesting can, by way of example, take place in that a (relative and/or absolute) addressing is handed over which unambiguously identifies the data part in the data memory. The addressing can, by way of example, designate a position of the data part in the data memory (by way of example in the form of a memory address or a memory offset value). By way of example, the addressing can designate an area of the data memory comprising a plurality of data parts. Based on the addressing, then (at least) the required data part is read and provided, by way of example returned to the application, the file system and/or the operating system. As stated above, generally it is not only the requested data part that is read but also other physically adjacent data parts. In the optimum case, the required data part no longer even has to be read from the data memory, but due to the prefetching of another data part has already been read from the data memory and is thus available, by way of example, in a faster cache. Thus, the data part can be provided in response to a request significantly faster with the method described.

According to an embodiment of the method of the first aspect, the method further comprises:

mapping an addressing used for the requesting of the data parts required for execution of the application to the order of the data parts stored in the data memory.

By mapping the addressing used for the requesting, the addressing (by way of example, at the file system level) can take place as normal. This means that the required data parts can be requested by means of the original addressing, as it would, for instance, for a conventional installation of the application. In particular, the addressing used for the requesting can be a first addressing, which is mapped to a second addressing. By way of example, a requested memory address or a first memory address area can be mapped to a second memory address or a second memory address area. By way of example, a first block number or a first block number range (or a plurality of ranges) can be mapped to a second block number or a second block number range (or a plurality of ranges). The mapping is preferably unambiguous, in particular one-to-one.

According to an embodiment of the method of the first aspect, the mapping of the addressing used takes place below the file system layer.

Generally, the file system represents a particular layer of the operating system. The layers above (such as further layers of the operating system or applications) can access files. The file system generally converts these abstract data into an addressing (by way of example, a block number, track, sector, or similar). In the layer below, the file system driver can to this end, by way of example, communicate with a relevant device driver.

Because the mapping of the addressing used now takes place below the layer of the file system, the mapping can be performed extremely efficiently. If the required data parts, by way of example, are requested from the file system layer (or a layer above this), the file system can address the data parts as normal, so that adaptations to the file system or above can be dispensed with. By way of example, the mapping takes place by a device driver. So, the mapping preferably takes place in a layer associated with device drivers.

The provision of the data parts necessary for execution of the application can thus also in particular take place from a layer associated with device drivers.

According to an embodiment of the method of the first aspect, the method further comprises:
  receiving the data parts required for executing the application.

It is possible for the data parts required for execution of the application to not yet be stored in the data memory, or at least only in part, during execution of the application. Then the remaining data parts can be completely or partially received. The data parts can, by way of example be received by another local or remote data memory. By way of example, the data parts are received via a network, by way of example via the Internet. The data parts are preferably received from a remote server via the Internet.

If, by way of example, it is determined that required data parts requested are not stored in the data memory, these data parts can be requested (by way of example from the remote server), in order to receive them. However, an individual request for required data parts not yet stored in the data memory is preferably unnecessary, since the data parts are preferably continuously received. This means that the data parts are received little by little similar to a stream, without individual data parts having to be requested. This accelerates the execution of the application further. If, by way of example, on the other hand it is determined that required data parts are already stored in the data memory or are currently not needed, the continuous reception described can also (at least in part) be skipped for the already stored and (currently) not needed data parts. These data parts can then, by way of example, be received at a later point in time.

The data parts can preferably (at least partly) be received in the order at least in some areas based on the expected required order. In this way, the data parts expected to be required first are also the first to be received. This is, in particular, advantageous, if the required data parts (in particular the data parts necessary for starting the application) first have to be received from a remote server.

The data parts required for execution of the application can in particular be received by at least a second device, as described in more detail in relation to further aspects.

According to an embodiment of the method of the first aspect, the method further comprises:
  storing the data parts in a data memory in the order which is at least in some areas based on an expected required order.

If the required data parts are not yet stored in the data memory, by way of example because these have to be received first, these are preferably stored following receipt in the data memory. Because the storage in the order at least in some areas is based on the expected required order, as already explained, an accelerated execution of the application is achieved.

According to an embodiment of the method of the first aspect, the data parts are data blocks and/or sequences of data blocks and the order is a block order.

It has been shown that an acceleration of the execution of the application can be achieved particularly effectively, if data blocks are stored in the data memory in a block order which is at least in some areas based on an expected required block order. The block order can, by way of example, specify the order of individual data blocks or sequences of data blocks.

A data block is considered in particular as a limited, set number of bytes. A data block can be considered to be an individual transport unit or as the smallest readable or writable unit in an access. The structure of a data block and the elements of a data block can depend on the respective data memory, file system or other factors.

A data block can, by way of example, have a size of 512 bytes to 4,096 bytes. Essentially, however, smaller and in particular larger data blocks are conceivable. In general, each data block can be unambiguously addressed in the data memory. This can take place using various methods. By way of example, an addressing of the data blocks via continuously numbered blocks (LBA) can take place. Similarly (in the case of hard discs with spindles) it is conceivable to address blocks via cylinder, head and sector number (CHS). Other data block addressing methods are also conceivable.

Also, particularly advantageous to an implementation of the method according to the first aspect on the basis of data blocks and a block order is the fact that in this way a high level of compatibility with practically all operating systems is achieved. The actual functionality can be implemented in practice irrespective of the platform. All that has to be achieved is, by way of example, an adaptation of the corresponding device driver to the method of working of the corresponding (virtual) block device in the respective operating system.

According to an embodiment of the method of the first aspect, the data parts are stored on a block device, in particular a virtual block device.

Through the use of a (virtual) block device, a data memory can be made available and the desired order of the data parts in the form of data blocks achieved. A (virtual) block device or block-oriented device is understood to be a (virtual) device, which stores or transfers data in data blocks. A block device can in particular use the operating system's own buffer. A block device can in particular be a hard disc, an SSD, a USB-stick or similar. A virtual block device in practice pretends to the operating system, that a block device is present and is communicating or can communicate with the operating system. In particular, a virtual block device is advantageous, since this can be made available in each system on a software basis, in particular through a device driver. The physical data memory can in this case by way of example be provided by a part of the data memory of a local hard disc.

The device driver can advantageously be associated with its own cache, in particular in the kernel space, or have this made available to it. This further accelerates the provision of data blocks. In this regard, the method of the first aspect preferably further comprises:
mounting the block device in an existing file system. In this way, the data stored on the block device or in the file system present therein can be made available to an operating system. With a virtual block device, the data are, by way of example, stored in an image.

According to an embodiment of the method of the first aspect, for the providing the data parts required for execution of the application from the data memory a device driver, preferably a block device driver, is used. The device driver is preferably a device driver for a virtual block device.

A device driver is in particular understood to be a computer program or software module, which controls the interaction with (virtual) devices. To this end, the driver can on the one hand, by way of example, communicate directly with the (virtual) device and exchange data with the (virtual) device. On the other hand, the device driver can, by way of example, offer the operating system and/or the application software (thus, in particular layers positioned above the layer associated with the device driver) a standardised interface, so that the (virtual) device can be addressed in the same way as similar devices.

In this regard, the method of the first aspect preferably further comprises: installing a device driver for providing the data parts required for execution of the application from the data memory. By way of example, the installation is initiated by a user. Then, the (virtual) device can be mounted in an existing file system. By means of the (virtual) device the data memory can ultimately be accessed, and the application executed.

According to an embodiment of the method of the first aspect, the method further comprises:
  suspending a processing of an event queue, in particular if the required data parts are not available in the data memory; and
  resumption of the processing of the event queue.

An event queue can in particular comprise operations (in particular write and/or read operations), intended to be applied to the data memory.

By way of example, in the event that the requested required data parts are not (yet) stored in the data memory and are thus not available, it can be advantageous to suspend the processing of an event queue, to avoid malfunctioning of the application. It is particularly advantageous if the event queue is the event queue of a device driver or (virtual) device as described previously. Then the suspension can, by way of example, be performed by the device driver. However, it is also basically possible to suspend the event queue of a device driver by an external command (of the operating system or of a program). It can be advantageous in so doing to take advantage of the fact that layers above the layer associated with the device driver, such as the file system, are waiting for the device driver. So, if data parts are not available, the situation is in practice as if there were a slow reading of the (virtual) device causing a delay.

By way of example, the processing of the event queue is suspended for a predetermined time. By way of example, the time for which the processing of the event queue is suspended is determined (by way of example calculated or estimated). If the data parts by way of example are received via a network, by way of example using the transmission rate it can be estimated when the required data parts will (are expected to) be received and can be stored in the data memory and thus be available.

It can then be checked if the data parts are available. If the data parts are available, the processing of the event queue can be resumed. Otherwise, a further suspension of the processing of the event queue can take place.

According to an embodiment of the method of the first aspect, the data parts at least with respect to data parts relevant for the application start are stored in the data memory in an order which is at least in some areas based on an expected required order.

Data parts relevant for the application start are understood to be data parts, which are relevant for starting the application. By way of example, data parts relevant for the application start are those data parts that are required to execute the application to the extent that the application can be used interactively by the user. By way of example, the data parts relevant for the application start account for less than 10% and/or less than 50 megabytes of the total application. This, in particular, allows the starting to be accelerated when executing the application.

However, independently of this, it is obviously also possible to store data parts, which are not directly required for starting the application (but only later), in an order which is at least in some areas based on an expected required order.

It is, by way of example, also conceivable that a first quantity of data parts of the application is provided for, in which the data parts are stored based on the expected required order, and a second quantity of data parts of the application is provided, in which the data parts are not based on, but are independent of, the expected required order. The first quantity can then, by way of example, comprise application-related data parts, so that a rapid execution is enabled, whereas the order of the data parts in the second quantity does not need to be optimised.

According to an embodiment of the method of the first aspect, the method further comprises:
  using metadata information associated with the application to execute the application.

Metadata information is in particular understood to be application-specific information which (at least partly) is required for executing the application. By way of example, the metadata information comprises changes which are made during the installation and/or execution of the application to the system executing the application (for instance, the operating system and/or file system). By way of example, the metadata information comprises path information, file information, directory information, information on environment variables and/or information on databases (for instance, registration databases) or modifications to these (for instance, new entries). The metadata information may also comprise further dependencies.

Similarly, the metadata information can comprise mapping information, allowing the mapping of the addressing used for requesting the data parts required for execution of the application to the order of the data parts stored in the data memory. However, the mapping information can also be transferred independently of the metadata information.

According to a second aspect, the invention also relates to a method for sending data parts, in particular for use in a method according to the first aspect, carried out by at least one device, the method comprising:

sending of data parts required for an execution of an application, wherein the data parts are stored in a data memory in an order which is at least in some areas based on an expected required order.

As already stated in connection with the first aspect, because the data parts are stored in a data memory in an order which is at least in some areas based on an expected required order, it is possible for the required data parts application to be generally available to the application more quickly than normal and in particular for the application startup process to be dramatically accelerated.

The method according to the second aspect can in particular be executed by at least one second device, described in more detail in connection with further aspects.

The data parts can, by way of example, be sent to a first device, which carries out a method according to the first aspect. By way of example, the data parts are stored in at least one file, by way of example an image. This means that only the image has to be sent. If the sent data parts are received and stored, these are advantageously automatically stored at the receiver in a data memory directly in an order which is at least in some areas based on an expected required order.

The way in which such an order can be determined is described by way of example in connection with the third aspect of the invention.

According to an embodiment of the method of the second aspect, the data parts are sent at least partly in the stored order.

Because the data parts are sent at least partly in the stored order, the data parts expected to be required first are the first to be sent and can be received first. Thus, in particular in a situation in which the required data parts (in particular the data parts required for starting the application) still have to be received (for instance by the first device), the time until starting the application is also shortened.

According to an embodiment of the method of the second aspect, the method further comprises:

receiving a request to send at least some of the data parts required for execution of the application.

If, by way of example, it is determined by the first device that required data parts are not stored in the data memory there, these data parts can be requested, in order for them to be received. The request to send the data parts can then be received in the course of the method of the second aspect, by way of example by a second device.

It is conceivable, that with the send request individual data parts or ranges of data parts are requested. However, individual requesting of required data parts is preferably unnecessary since the data parts are preferably sent continuously. This means that the data parts are sent little by little similar to a stream, without a request for individual data parts having to be received. This accelerates reception and thus the execution of the application further.

According to an embodiment of the method of the second aspect the method further comprises:

sending of metadata information associated with the application for execution of the application.

As already explained in connection with the first aspect, the metadata information comprises, by way of example, path information, file information, directory information, information on environment variables and/or information on databases (for instance, registration databases) or modifications to these (for instance, new entries). The metadata information can, by way of example, similarly be contained in the at least one file. Similarly, at least one separate file can be provided, in which the metadata information is contained. The metadata information can also be held in the memory. The metadata information is preferably sent first. By way of example, the metadata information can be sent in the course of a push process or in the course of a pull process.

Similarly, the metadata information can comprise mapping information, allowing the mapping of the addressing used for requesting the data parts required for executing the application to the order of the data parts stored in the data memory. However, the mapping information can also be transferred independently of the metadata information.

In relation to further embodiments, in particular with regard to the embodiment of the data parts as data blocks, reference is made to the statements in connection with the first aspect.

According to a third aspect, the invention also relates to a method for storing required data parts, carried out by at least one device, said method comprising:

receiving an acquired required order of the data parts required for executing an application;

determining an expected required order at least based on the acquired required order; and storing the required data parts in a data memory in an order which is at least in some areas based on the expected required order.

The method allows the required data parts to be stored in a data memory in an order which is at least in some areas based on an expected required order.

At least based on the acquired required order, an expected required order can be determined. By way of example, the acquired required order corresponds to the expected required order. By way of example, the acquired required order is just one of a plurality of factors (by way of example, further acquired required orders), in determining the expected required order.

Finally, the required data parts can be stored in a data memory in an order which is at least in some areas based on an expected required order. As a consequence, the data parts are thus rearranged, compared to the original stored order, as exists by way of example following a normal installation of the application in a data memory. Thus, an optimised application is available. As already explained in connection with the first aspect, this allows execution of the application to now be accelerated, by way of example according to the method of the first aspect.

In addition, mapping information can be stored, allowing a mapping between the originally stored order, as exists, by way of example following a normal installation of the application in a data memory, and the rearranged order. In other words, the mapping information allows a mapping of the addressing used for requesting the data parts required for execution of the application to the order of the data parts rearranged in the data memory.

The method does not necessarily have to be performed for all data parts required by the application, it can, by way of example, also be performed for just some of the required data parts.

The method can in particular be carried out by at least a third device, as described in more detail in relation to further aspects.

According to an embodiment of the method of the third aspect, the method further comprises one or more of the following steps:

installing a device driver, preferably a block device driver;

generating an image;

mounting a device via a device driver, in particular via the installed device driver;

installing the application, in particular on the image generated;

determining metadata information associated with the application for the execution of the application;

executing the application;

acquiring the required order of the data parts required for the execution of an application.

One or more of the steps serves or serve in particular to prepare the acquisition of a required order of the data parts required for execution of the application. One or more (in particular all) the above steps is (are) by way of example carried out on one or more data processing system(s), in particular in an analysis environment. An analysis environment is in particular understood to be a technical/organisational infrastructure, used to analyse software.

Through a device driver, in particular a block device driver, the acquisition of a required order of data parts required to execute the application can be performed extremely efficiently. An image can also be generated. Following installation of the device driver, a device, in particular a block device, and thereby the image, can be mounted via the device driver in an existing file system. Here, the block device is preferably a virtual block device. The device and thus the image can be accessed via the device driver. Then the application can be installed on the device and thus on the image.

In addition, metadata information associated with the application can now be determined for execution of the application. This can, by way of example, take place by a comparison of the system (for instance of the operating system and/or file system) before installation and after installation of the application. Similarly, the performance of actual system changes (by way of example by acquisition of write and/or read processes) can be acquired. This simplifies the execution of the application on other devices (by way of example the first device). These require just an image of the already installed application and the metadata information to be made available, with a re-installation being unnecessary. As already explained in connection with the first and second aspect, the metadata information comprise, by way of example, path information, file information, directory information, information on environment variables and/or information on databases (for instance, registration databases) or modifications to these (for instance, new entries).

Next, the application can be executed. This application corresponds to the application to be executed according to the method of the first aspect. In this regard, reference is made to the statements in connection with the first aspect. However, here the data parts required by the application are initially (at least partly) not yet stored in an order which is at least in some areas based on an expected required order.

In the course of the execution of the application, the application will require data parts for its execution in a certain (chronological) order. To this end, by way of example the application, the operating system and/or the file system can request the required data parts. This order can be acquired, wherein this can advantageously take place below the level of the file system. By way of example, the acquisition takes place by a device driver. As already explained in connection with the first aspect, the data parts are preferably data blocks and the order is a block order. On this point reference is made to the statement in connection with the first aspect.

According to an embodiment of the method of the third aspect, the acquired required order of the data parts required for execution of the application comprises logged information on read operations on the required data parts during execution of the application.

In this way, the acquisition of the order of the data parts required for execution of the application can be performed extremely efficiently. Logging of information is particularly advantageously performed by the device driver. By way of example, write and/or read operations defined in the device driver are extended, so that these in any case allow logging of information on read operations on the required data parts during execution of the application. Logging of information on read operations on the required data parts can, by way of example, be carried out in that a (relative or absolute) addressing is logged. By way of example, a log-file is generated, containing the logged information.

According to an embodiment of the method of the third aspect, the logged information allows an unambiguous identification of the respective required data part.

An unambiguous identification can, by way of example, be achieved by logging an unambiguous (relative and/or absolute) addressing. The addressing can, by way of example, comprise an unambiguous position of the data part in the data memory (by way of example in the form of an unambiguous memory address or an unambiguous memory offset value). By way of example, the addressing can designate an unambiguous area of the data memory comprising a plurality of data parts. If the data parts, by way of example, are data blocks, by way of example an unambiguous block number or an unambiguous block number range can be logged.

According to an embodiment of the method of the third aspect, the logged information also comprises one or more of the following information:

time information;

application-specific events;

user-specific information.

The time information can, by way of example, comprise relative and/or absolute time information on the point in time when a data part or a range of data parts was needed, that is to say in particular when a read access to the corresponding data part or range took place.

Application-specific events can, by way of example, be the commencement of the startup of the application, the commencement of an interactive part of the application, and/or the commencement of a certain application section (in a game, by way of example, commencement of level one, level two, level three, and so on).

User-specific information can, by way of example, be user input information. Input information is in particular information on inputs entered by means of input devices (for example with the keyboard or with the mouse), by way of example which keys were pressed.

The determination of the expected required order can then advantageously be carried out based on one or more of these items of information. By way of example, certain user-specific information, such as input information, can influence the expected required order. This can then, by way of example, be taken into account upon receiving the data parts required for execution of the application.

According to an embodiment of the method of the third aspect, multiple acquired required orders of the data parts required for execution of an application are received, and the expected required order is determined at least based on the multiple acquired required orders.

By way of example, the acquisition is performed at least twice, but preferably a number of times. If the expected required order is then determined at least based on the multiple acquired required orders, the expected required order can be determined more reliably. This is in particular advantageous with interactive applications, in which the program flow of the application can be influenced by the user, since in this way the order of the required data parts is also influenced. By way of example, to this end the respective acquired required orders are consolidated, to form a consolidated or combined order, on the basis of which the expected required order can be determined.

The multiple acquisition can, by way of example, be carried out on various devices, by way of example on a series of analysis devices. On the other hand, the determination of the expected required order and the saving of the required data parts can preferably be carried out on a central device.

According to an embodiment of the method of the third aspect, in the event of a sequential section of an acquired required order the sequential section is condensed.

By this, it can be achieved that sequential sections of required orders are conserved, as far as possible, as one sequence, in particular also in case the acquisition is performed multiple times and the acquired required orders are combined. If, therefore, by way of example, in one instance the sequential section (2, 3, 4, 5 . . . n−1, n) of required data parts is acquired, the sequential section can be condensed as (2 . . . n) and logged as such. The sequential sections do not necessarily have to be condensed, though. By way of example, only sequential sections of a certain length or a maximum number of sequential sections are condensed.

According to the third aspect, stored required data parts can then by way of example be sent according to the method of the second aspect. In a method of the first aspect, the startup of the application can ultimately be accelerated.

According to a further aspect, the invention also relates to a device, which is configured as, or comprises, suitable means for carrying out and/or controlling the method according to the first aspect (first device). The first device can in particular be a data processing system of an end user, by way of example a client.

According to a further aspect the invention also relates a computer program, comprising program instructions, allowing a processor to carry out and/or control a method according to the first aspect (or parts thereof) if the computer program runs on the processor (first computer program).

According to a further aspect, the abovementioned aim is also achieved by a device which is configured or comprises suitable means for carrying out and/or controlling the method according to the second aspect (second device). The second device can in particular be a server, that makes data available to end users.

According to a further aspect the invention also relates to a computer program, comprising program instructions, allowing a processor to carry out and/or control a method according to the second aspect (or parts thereof) if the computer program is running on the processor (second computer program).

According to a further aspect, the abovementioned aim is also achieved by a device, which is configured as, or comprises suitable means for carrying out and/or controlling a method according to the third aspect (third device). The third device can in particular comprise a plurality of data processing systems, by way of example the third device comprises a plurality of analysis data processing systems and a central server.

According to a further aspect, the invention also relates to a computer program, comprising program instructions, allowing a processor to carry out and/or control a method according to the third aspect (or parts thereof) if the computer program is running on the processor (third computer program).

The respective device preferably comprises at least one processor and at least at least one memory with computer program code, wherein the at least one memory and the computer program code are configured to carry out and/or control at least one processor, with at least one method according to the first, second and/or third aspect.

For example, the first, the second and the third device are data processing systems that are different from one another, configured on a software and/or hardware basis, to be able to carry out the respective step (or some of these) of the respective method according to the invention. Configured on a software and/or hardware basis is intended to mean, for example, the preparation of the respective data processing system, which is necessary to be able to carry out the steps (or part thereof) of a respective method, by way of example in the form of a computer program. Examples of a data processing system are a computer, a desktop computer, a portable computer such as a laptop computer, a tablet computer, a personal digital assistant, a Smartphone and/or a thin client.

However, it is also basically conceivable that, by way of example steps of individual aspects, by way of example of the second and third aspect, are carried out on a shared data processing system. It is similarly conceivable, that steps of an aspect are carried out on different data processing systems.

For example, the first, the second and/or the third device each contain means for executing one of the computer programs according to the invention, such as a processor. A processor is intended, for example, to be understood to be a control unit, a microprocessor, a microcontrol unit such as a microcontroller, a Digital Signal Processor (DSP), an Application Specific Integrated Circuit (ASIC) or a Field Programmable Gate Array (FPGA).

For example, the first, the second and/or the third device also in each case comprise means for storing information such as a program memory and/or a main memory.

For example, the first, the second and/or the third device also in each case comprise means for receiving and/or sending information via a network such as a network interface. For example, the first, the second and/or the third device are connected and/or connectable together via one or more networks.

The computer programs are, by way of example, distributable via a network. A computer program can at least partly be software and/or firmware of a processor.

The first, the second and/or the third computer program can, by way of example, comprise an application program. The first and/or second computer program comprises in particular a device driver.

The computer programs according to the invention can in each case be stored in a machine-readable storage medium, containing one or more computer programs according to the invention and, for example, is configured as a magnetic, electric, electromagnetic, optical and/or other type of storage medium. Such a machine-readable storage medium is preferably physical (thus, tangible), for example being configured as a data medium device. Such a data medium device is, by way of example, portable or permanently installed in a device. Examples of such a data medium device are a volatile or non-volatile memory with random access (RAM) such as, for example, NOR flash memory or with sequential access such as NAND flash memory and/or memory with read (ROM) or read/write access. Machine-readable is, for example, intended to mean that the storage medium can be read (out) or written to by a computer or a data processing system, by way of example by a processor.

The exemplary embodiments described in this description are also intended to be disclosed in all combinations with one another.

Further advantageous exemplary embodiments of the invention are indicated by the following detailed description of a number of practical examples of the present invention, in particular in connection with the figures.

The figures attached to the application, however, are only intended to be used for the purpose of clarification, and not to determine the scope of protection of the invention. The attached drawings are not to scale and are intended only as examples reflecting the general concept of the present invention. In particular, features shown in the figures should not in any way be considered an essential component part of the invention.

DETAILED DESCRIPTION OF A NUMBER OF EXEMPLARY EMBODIMENTS OF THE PRESENT INVENTION

Figure 1:
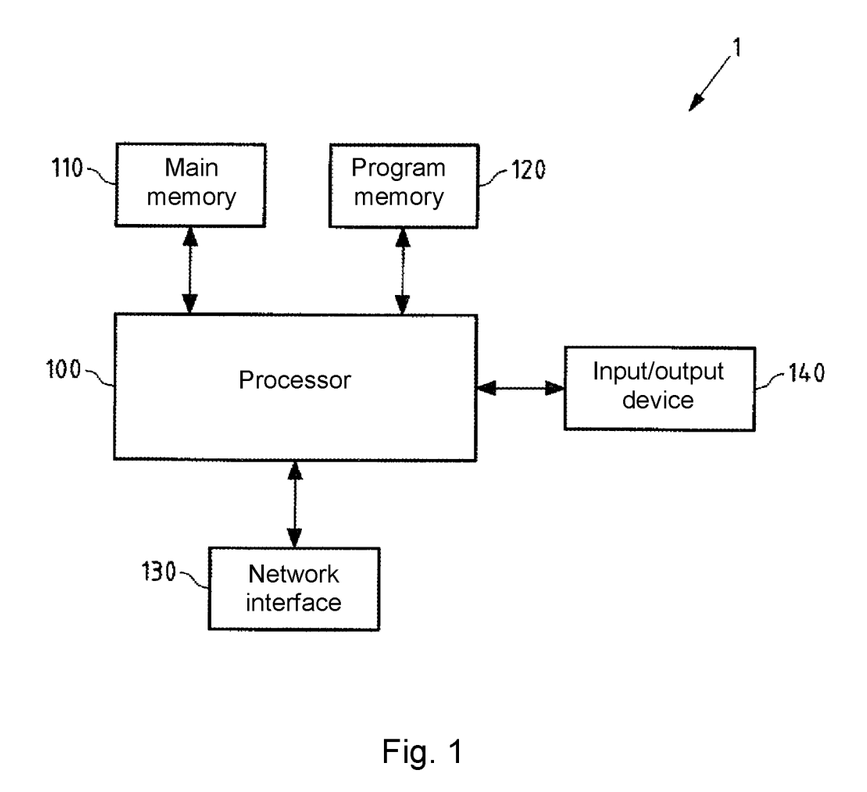
FIG. 1 shows a block diagram of an exemplary data processing system.

FIG. 1 shows a block diagram of an exemplary embodiment of a data processing system 1. The data processing system 1 serves as an example for devices according to the various aspects, in particular the first, the second and/or the third device can be implemented according to the data processing system 1.

The data processing system 1 can, by way of example, be a computer, a desktop computer, a portable computer such as a laptop computer, a tablet computer, a personal digital assistant, a Smartphone and/or a thin client. The data processing system can, by way of example, perform the function of a server or a client.

Processor 100 of the data processing system 1 is in particular configured as a microprocessor, a microcontrol unit such as a microcontroller, a Digital Signal Processor (DSP), an Application Specific Integrated Circuit (ASIC) or a Field Programmable Gate Array (FPGA).

Processor 100 executes program instructions, stored in program memory 120, and stores, by way of example, intermediate results or similar in a main memory 110. For example, program memory 120 is a non-volatile memory such as a flash memory, a magnetic memory, an EEPROM memory (electrically erasable programmable read-only memory) and/or an optical memory. Main memory 110 is, for example, a volatile or non-volatile memory, in particular a Random Access Memory (RAM) such as a static RAM memory (SRAM), a dynamic RAM memory (DRAM), a ferroelectric RAM memory (FeRAM) and/or a magnetic RAM memory (MRAM).

Program memory 120 is preferably a local data medium with a fixed connection to the data processing system 1. Data media with a fixed connection to the data processing system 1 are, by way of example, hard discs, incorporated in the data processing system 1. Alternatively, the data medium can, by way of example, also be a data medium that is separably connected to the data processing system 1, such as a memory stick, a removable storage device, a portable hard drive, a CD, a DVD and/or a diskette.

Program memory 120 contains the operating system of the data processing system 1, which when the data processing system 1 is started up is loaded at least partly into the main memory 110 and executed by the processor 100. In particular, when the data processing system 1 is started up, at least a part of the core of the operating system is loaded into the main memory 110 and executed by the processor 100. The operating system of data processing system 1 is, by way of example, a Windows, UNIX, in particular Linux, Android, Apple iOS and/or MAC operating system.

The operating system allows in particular the use of the data processing system 1 for data processing. It manages, by way of example, resources such as main memory 110 and program memory 120, network interface 130, and input/output device 140, makes available, inter alia through programming interfaces, other basic program functions, and controls the execution of programs.

Processor 100 controls the network interface 130 which, by way of example, is and is configured as a network card, a network module and/or a modem, to create a link between the data processing system 1 and a network. Network interface 130 can, by way of example, receive data via the network and pass this on to processor 100 and/or receive data from processor 100 and send it via the network. Examples of a network are a local area network (LAN) such as an Ethernet network or an IEEE 802 network, a wide area network (WAN), a wireless network, a wired network, a mobile telephone network, a telephone network and/or the Internet.

Processor 100 can further control at least one input/output device 140. Input/output device 140 is by way of example a keyboard, a mouse, a display unit, a microphone, a touch-sensitive display device, a loudspeaker, a scanner, a disc drive and/or a camera. Input/output device 140 can, by way of example, receive inputs from a user and pass these on to processor 100 and/or receive output information for the user from processor 100.

Figure 2:
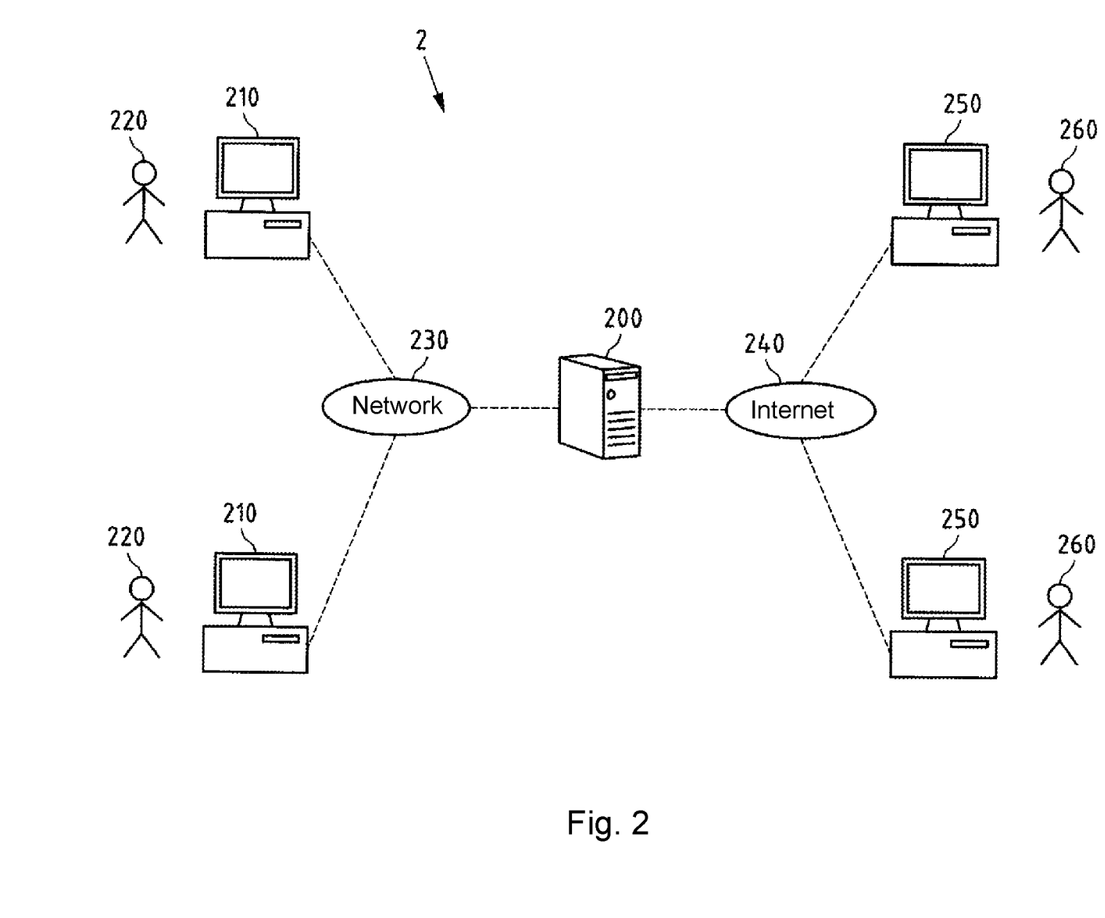
FIG. 2 shows a schematic representation of a system of various exemplary devices for carrying out the method according to the various aspects.

FIG. 2 is a schematic representation of a system 2 of various exemplary devices for carrying out the method according to the various aspects.

Server 200, together with the computers 210, can carry out embodiments of the method according to the third aspect, as described in more detail in connection with FIG. 3. Similarly, server 200 can carry out embodiments of the method according to the second aspect, as described in more detail in connection with FIG. 5. Finally, the computers 250 can carry out embodiments of the method according to the first aspect, as described in more detail in connection with FIG. 6.

Figure 3:
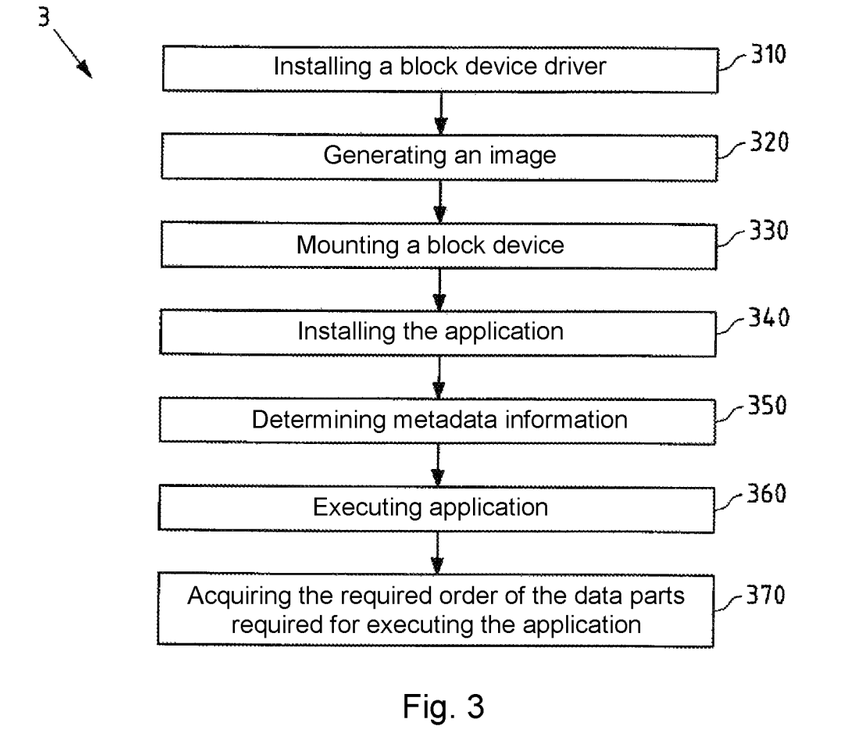
FIG. 3 shows a flow diagram of an exemplary method, which can be carried out in the context of an exemplary embodiment of a method according to the third aspect.

FIG. 3 shows, to begin with, a flow diagram 3 of an exemplary method, which can be carried out in the context of an exemplary embodiment of a method according to the third aspect.

The method can be carried out on one or more of the computers 210. Here, the computers 210 provide an analysis environment. To begin with, in each case a block device driver for a virtual block device is installed (step 310). Next, an image is generated on the respective computer 210 (step 320). With the help of the block device driver a virtual block device and thereby the image can be mounted in the file system of the operating system of the respective computer 210 (step 330). Then an application to be optimised (for instance, a computer game) can be installed on the image generated (step 340). Here, the image is physically stored in the respective local program memory 120 (for example, on the hard disk) of the respective computer 210. The data blocks required for execution of the application are thus present in the respective program memory. However, these are not yet stored in an optimised order 30.

In step 350, which can be carried out after step 340 or at least partly also during step 340, metadata information associated with the application can be determined for execution of the application. In doing so, changes to the operating system and file system installed on the respective computer 210 are acquired, which are necessary for starting the application. These are stored, by way of example, in a file.

Then the application can be executed on the respective computer 210 (step 360) and used by the respective user 220. In doing so, the required order of data blocks required for executing an application can be acquired (step 370).

Figure 4:
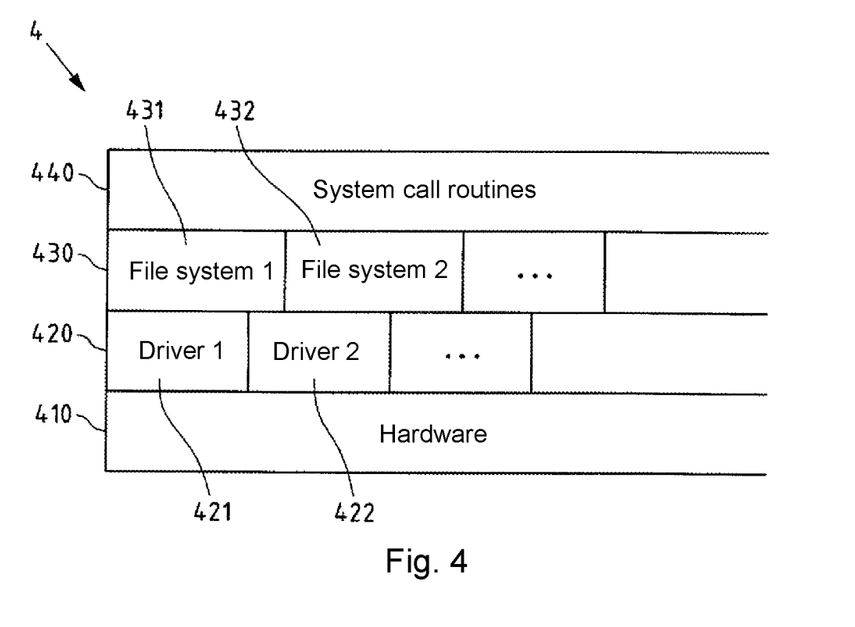
FIG. 4 shows a schematic representation of various layers of an operating system.

On this point, FIG. 4 is a schematic representation of various layers of an operating system 4, as present, by way of example, on the individual computers 210 or 250. Four layers 410,420,430,440 are shown. An operating system 4 can also have additional layers, arranged above, below or in between. In layer 420, device drivers 421, 422 ("Drive 1", "Driver 2") are provided. These can be a computer program or software module, controlling the interaction with the hardware of the underlying layer 410. On the other side, the device driver communicates with a file system 431, 432 of layer 430 ("file system 1", "file system 2"). The file systems can, in turn, communicate with the system call routines of the layer 440 which, by way of example can be used by the application. Basically, various instances of a driver can also be used, by way of example so that various file systems only have to communicate with one driver. By way of example, a plurality of instances can use a virtual block device simultaneously, each containing a different application.

If the application now needs certain data blocks, these are requested via a file system, by way of example file system 431. This request is handled by the block device driver, by way of example drive 421, which can access the application installed on the image, and the required data blocks are returned.

Here the write and/or read operations in the block device driver 421 are extended such that the requested data block is logged (for instance, by logging a block number, a memory address and/or a memory offset unambiguously identifying the data block). Thus, the required block order of the data blocks required for execution of the application are logged by means of the block device driver 421. In addition, time information in the form of a time offset is logged. Further information such as application-specific events or user-specific information can similarly be logged.

By way of example, on one of the computers 210, the following first required order is acquired, indicating the block number of the required data block and the associated time offset:

| | Block index | | | | | |
|---|---|---|---|---|---|---|
| | 0 | 2 | 0 | 8 | 5 | 7 |
| Time offset | 0.00 | 0.00 | 0.01 | 0.02 | 1.20 | 1.30 |

By way of example, on another of the computers 210 the following second required order is acquired, indicating the block number of the required data block and the associated time offset:

| | Block index | | | | | |
|---|---|---|---|---|---|---|
| | 0 | 2 | 0 | 9 | 5 | 6 | 7 |
| Time offset | 0.00 | 0.00 | 0.01 | 0.02 | 0.02 | 1.10 | 1.30 |

Figure 5:
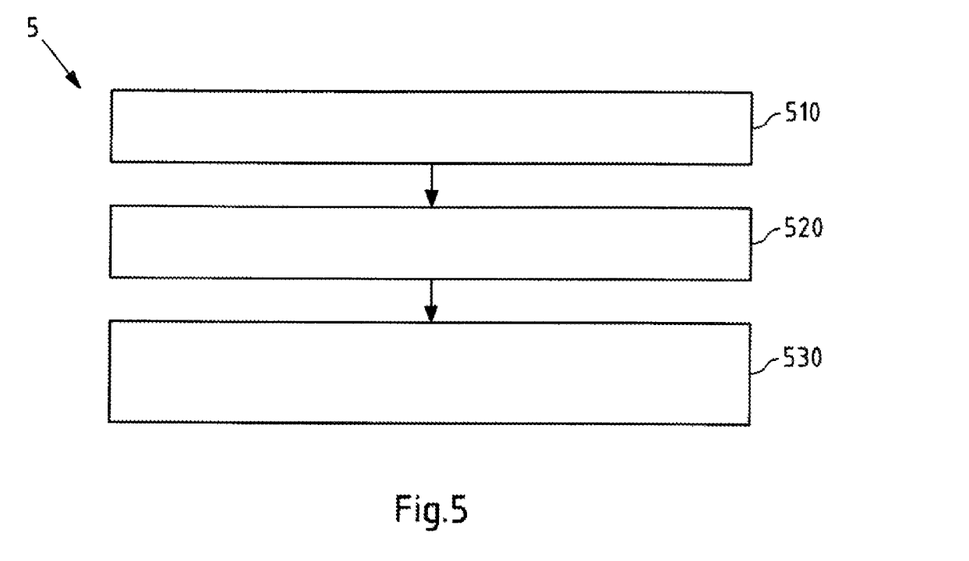
FIG. 5 shows a flow diagram of an exemplary embodiment of a method according to the third aspect.

Next, FIG. 5 shows a flow diagram of an exemplary embodiment of a method according to the third aspect.

The multiple acquired orders can, by way of example, be made available to the server 200 via the network 230, so that the server receives the acquired required orders of data blocks required for execution of an application (step 510).

On the basis of these, the server 200 can determine an expected required order (step 520). To this end, multiple acquired orders can be sorted and condensed according to the time information, resulting in the following order:

| | Block index | | | | | | | |
|---|---|---|---|---|---|---|---|---|
| | 0 | 2 | 0 | 8 | 9 | 5 | 6 | 7 |
| Time offset | 0.00 | 0.00 | 0.01 | 0.02 | 0.02 | 0.02 | 1.10 | 1.30 |

The expected required block order (0, 2, 0, 8, 9, 5, 6, 7) can also be determined therefrom. Optionally, multiple data blocks contained can be ignored, so that the expected required block order (0, 2, 8, 9, 5, 6, 7) results.

The expected required block order determined in this way is then used to store the required data blocks in a data memory in an order which is at least in some areas based on an expected required order, in particular in the expected required order itself (step 530).

By way of example, the data blocks of the original image, exhibiting the installed application, are rearranged. In addition, mapping information is stored, allowing a mapping of the original image to the rearranged image.

Figure 6:
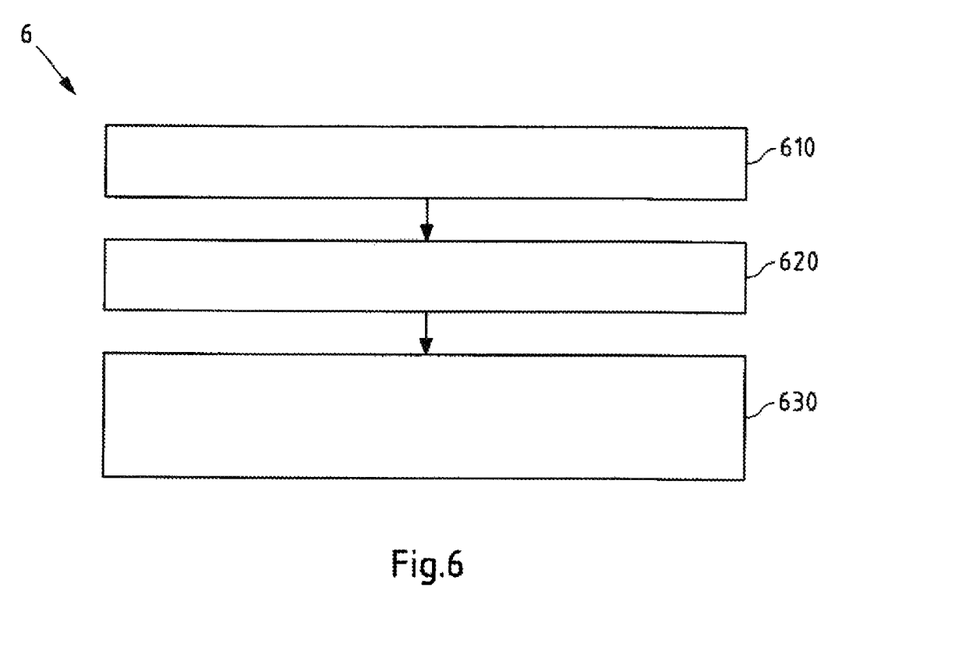
FIG. 6 shows a flow diagram of an exemplary embodiment of a method according to the second aspect.

Next, FIG. 6 shows a flow diagram 6 of an exemplary embodiment of a method according to the second aspect. The method can, by way of example, similarly be carried out by server 200.

To begin with, the server 200 receives a request to send at least some of the data blocks required for execution of the application (step 610). The request can, by way of example, be made by one of the computers 250 via a network such as the Internet 240.

If on the corresponding computer 250 no metadata information associated with the application for execution of the application is yet available, these can be sent first (step 620). Together with the metadata information, or separately from them, the stored mapping information, allowing a mapping of the original image to the rearranged image, are also sent to the computer 250. Next, the required data blocks are sent to the corresponding computer (step 630). By way of example, the image is sent with the data blocks of the application rearranged as described. In doing so, the data blocks are stored on the server 200 in a data memory already in the order which is at least in some areas based on an expected required order, as enabled by step 530. In doing so, the data blocks are also preferably sent in stored order.

Figure 7:
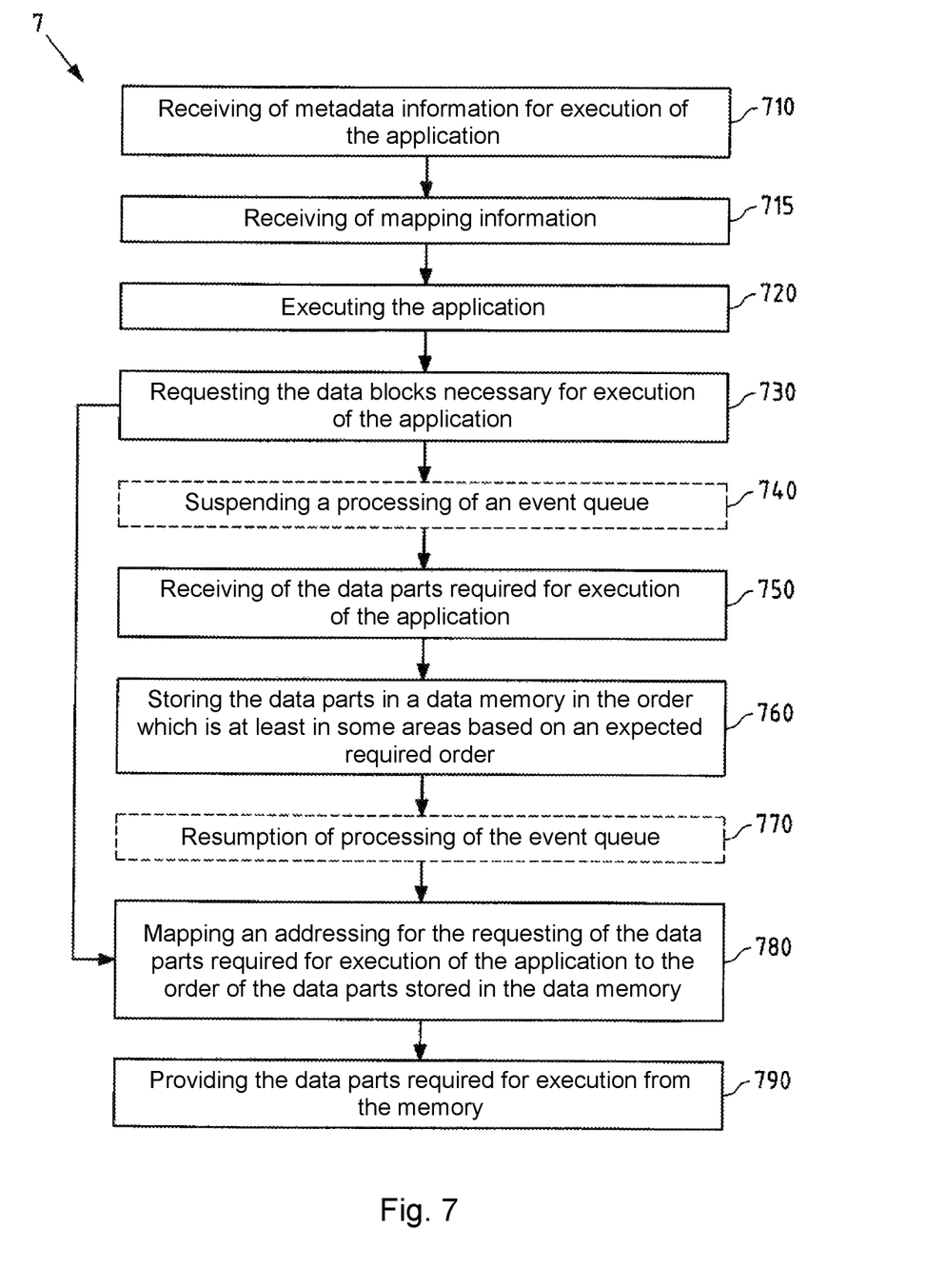
FIG. 7 shows a flow diagram of an exemplary embodiment of a method according to the first aspect.

FIG. 7 shows a flow diagram 7 of an exemplary embodiment of a method according to the first aspect. The method can, by way of example, in each case be carried out by the computer 250. By way of example, a user 260 of a computer 250 wishes to execute the application. To this end, the corresponding computer 250 can, by way of example, send a request via the Internet 240 to the server 200.

On the corresponding computer 250, a block device driver for a virtual block device is already installed. In this way, a virtual block device can be mounted in the file system of the operating system of the computer 250. The installation of a block device driver (for instance, driver 421) and the mounting of a virtual device have already been explained in more detail in connection with FIGS. 3 and 4 and this can take place in the same way here. If it has not yet taken place, the computer 250 can receive metadata information for execution of the application associated with the application (step 710) sent, for instance, according to step 620. Computer 250 similarly also receives with the metadata information (or separately from this) the stored mapping information, allowing a mapping of the original image to the rearranged image (step 711).

Computer 250 preferably also receives information (for instance, the size) on a storage space required for the data parts.

With the help of this information (for instance, path information and file information) a mounting of an image with the necessary size can take place and the application can (by way of example, by means of an executable file) be executed (step 720). This applies even if no data block of the application has yet been stored locally in the data memory of the corresponding computer 250, since information is already available via an executable file.

The application now requires data blocks for its execution. These are, by way of example, requested by the file system (for instance, file system 431) from the block device driver (for instance, driver 421) (step 730).

In the event that the necessary data blocks are not available in the data memory, processing of the device driver event queue is suspended (optional step 740). If the data blocks are already available, the process can continue from step 780 (see below). However, if a suspension occurs, data blocks necessary for the execution of the application can first be received from server 200 (step 750).

The data blocks are stored directly in the local data memory (for instance, a hard disc) of the corresponding computer 250 in an order which is at least in some areas based on an expected required order (step 760), since these are transferred in this way from server 200 due to the rearranged image.

If the data blocks are available locally, the processing of the event queue of the device driver can be resumed (optional step 770).

Since the requested data blocks have been changed due to the change in block order of the data blocks in the image received, the device driver maps the addressing used to request the data blocks required for executing the application to the order of the data blocks stored in the data memory (step 780). This is possible since mapping information previously stored by server 200, allowing a mapping of the original image to the rearranged image, has been transferred to the computer 250.

Thus, the data blocks required for execution of the application can be provided from the data memory of the computer 250 by the block device driver. Because the data blocks are already stored in the data memory in the order which is at least in some areas based on an expected required order (step 790), the provision can take place extremely efficiently. In particular, the starting of the application can in this way be accelerated independently of whether application has still to be downloaded from server 200 or is already stored on computer 250.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for executing an application which is performed by at least one device, said application being an interactive application, in which a program flow of the application is at least partially influenced by a user of the application, said method comprising:

provisioning data blocks from a data memory, which are required for the execution of the application, the data blocks being stored in the data memory in a physical order which is at least in some areas based on an expected required chronological block order so as to achieve a data prefetching of the data blocks when a requested data block is read from the data memory by also reading physically adjacent data blocks stored in the data memory according to the expected required chronological block order, and wherein the expected required chronological block order is based at least on a combination of multiple required chronological block orders acquired during respective executions of the application, wherein, for said combination, the multiple required chronological block orders are sorted according to time information and merged, wherein sequential sections of required chronological block orders are conserved, when said multiple required chronological block orders are combined;

suspending a processing of an event queue, if the required data blocks are not available in the data memory; and resuming of the processing of the event queue, if the required data blocks are available in the data memory.

2. The method according to claim 1, wherein the method further comprises:

requesting of the data blocks required for execution of the application.

3. The method according to claim 2, wherein the method further comprises:

mapping an addressing used for the requesting of the data blocks required for execution of the application to the order of the data blocks stored in the data memory.

4. The method according to claim 3, wherein the mapping of the addressing used takes place below a file system layer.

5. The method according to claim 1, wherein the method further comprises:

receiving the data blocks required for execution of the application.

6. The method according to claim 1, wherein the method further comprises:

storing the data blocks in the data memory in the order which is at least in some areas based on an expected required order.

7. The method according to claim 1, wherein the data blocks are stored in a virtual block device.

8. The method according to claim 1, wherein a block device driver is used for the providing of the data blocks required for execution of the application from the data memory.

9. The method according to claim 1, wherein the data blocks at least with respect to data blocks relevant for the application start are stored in the data memory in an order which is at least in some areas based on an expected required order.

10. The method according to claim 1, wherein the method further comprises:

using metadata information associated with the application to execute the application.

11. A device configured to, or comprising, means for, carrying out and/or controlling the method according to claim 1.

12. A non-transitory, machine-readable medium having stored thereon a computer program, comprising program instructions, allowing a processor to carry out and/or control the method according to claim 1 if the computer program runs on the processor.

13. A method for sending data blocks carried out by at least one device, the method comprising:

sending of data blocks required for an execution of an application, said application being an interactive application, in which thowhich a program flow of the application is at least partially influenced by a user of the application, wherein the data blocks are stored in a data memory in a physical order which is at least in some areas based on an expected required chronological block order so as to achieve a data prefetching of the data blocks when a requested data block is read from the data memory by also reading physically adjacent data blocks stored in the data memory according to the expected required chronological block order, wherein the expected required chronological block order is based at least on a combination of multiple required chronological block orders acquired during respective executions of the application, wherein, for said combination, the multiple required chronological block orders are sorted according to time information and merged, wherein sequential sections of required chronological block orders are conserved, when said multiple required chronological block orders are combined.

14. The method according to claim 13, wherein the data blocks are sent at least partly in the stored order.

15. The method according to claim 13, wherein the method further comprises:

receiving a request to send at least some of the data blocks required for execution of the application.

16. The method according to claim 13, wherein the method further comprises:

sending of metadata information associated with the application for execution of the application.

17. A method for storing data blocks carried out by at least one device, said method comprising:

receiving multiple acquired required chronological block orders of the data blocks required for executing an application, said application being an interactive application, in which a program flow of the application is at least partially influenced by a user of the application, wherein the multiple acquired required chronological block orders of the data blocks required for respective executions of the application comprise logged information on read operations on the required data blocks during the respective executions of the application, wherein the logged information also comprises time information;

determining an expected required chronological block order at least based on a combination of the multiple acquired required chronological block orders, wherein, for said combination, the multiple required chronological block orders are sorted according to time information and merged, wherein sequential sections of required chronological block orders are conserved, when said multiple required chronological block orders are combined; and storing the required data blocks in a data memory in a physical order which is at least in some areas based on the expected required chronological block order so as to achieve a data prefetching of the data blocks when a requested data block is read from the data memory by also reading physically adjacent data blocks stored in the data memory according to the expected required chronological block order.

18. The method according to claim 17, wherein the method further comprises one or more of the following steps:

installing a block device driver;
generating an image;
mounting a device via the installed device driver;
installing the application on the image generated;
determining metadata information associated with the application for the execution of the application;
executing the application;
acquiring the required order of the data blocks required for the execution of the application.

19. The method according to claim 17, wherein the logged information allows an unambiguous identification of the respective required data block.

20. The method according to claim 17, wherein the logged information also comprises one or more of the following information:
application-specific events;
user-specific information.

21. The method according to claim 17, wherein in an event of a sequential section of an acquired required order the sequential section is condensed.

* * * * *

UNITED STATES PATENT AND TRADEMARK OFFICE
CERTIFICATE OF CORRECTION

| | |
|---|---|
| PATENT NO. | : 11,216,286 B2 |
| APPLICATION NO. | : 15/964321 |
| DATED | : January 4, 2022 |
| INVENTOR(S) | : Sixten Boeck |

It is certified that error appears in the above-identified patent and that said Letters Patent is hereby corrected as shown below:

In the Claims

Column 22, Claim 13, Line 3, reads "cation, in which thowich a program flow of the" and should read --cation, in which a program flow of the--

Signed and Sealed this
Twenty-sixth Day of April, 2022

Katherine Kelly Vidal
*Director of the United States Patent and Trademark Office*